United States Patent [19]
Hashimoto et al.

[11] Patent Number: 5,543,991
[45] Date of Patent: Aug. 6, 1996

[54] TAPE CASSETTE HAVING A REAR COVER COMPOSED OF TWO PIECES OF PLATES ROTATABLY CONNECTED TO EACH OTHER

[75] Inventors: Yasufumi Hashimoto, Katsuta; Hiroyuki Umeda; Tsunehisa Ohira, both of Sagamihara, all of Japan

[73] Assignee: Victor Company of Japan, Ltd., Yokohama, Japan

[21] Appl. No.: 241,132

[22] Filed: May 10, 1994

Related U.S. Application Data

[63] Continuation-in-part of Ser. No. 195,752, Feb. 10, 1994, Pat. No. 5,453,896, which is a continuation-in-part of Ser. No. 980,978, Nov. 24, 1992, Pat. No. 5,404,261.

[30] Foreign Application Priority Data

May 20, 1993 [JP] Japan ..................... 5-141434
May 11, 1993 [JP] Japan ..................... 5-132982

[51] Int. Cl.$^6$ .................................. G11B 23/02
[52] U.S. Cl. .......................... 360/132; 242/347.1
[58] Field of Search ............................ 360/132, 134, 360/94, 96.5; 242/347, 347.1

[56] References Cited

U.S. PATENT DOCUMENTS

| | | | |
|---|---|---|---|
| 4,558,387 | 12/1985 | Shiba et al. | 360/132 |
| 4,680,660 | 7/1987 | Ueda | 360/132 |
| 4,685,016 | 8/1987 | Baranski | 360/132 |
| 5,065,955 | 11/1991 | Fujii | 360/132 |
| 5,225,954 | 7/1993 | Kondo | 360/132 |
| 5,330,128 | 7/1994 | Li et al. | 360/132 |
| 5,422,773 | 6/1995 | Ozaki et al. | 360/132 |

FOREIGN PATENT DOCUMENTS

| | | |
|---|---|---|
| 0501719 | 9/1992 | European Pat. Off. |
| 0529964 | 3/1993 | European Pat. Off. |
| 0584819 | 3/1994 | European Pat. Off. |
| 63-16827 | 4/1988 | Japan |
| 63-31265 | 8/1988 | Japan |
| 03-235279 | 10/1991 | Japan |
| 5-242641 | 9/1993 | Japan |
| 5-266628 | 10/1993 | Japan |
| 5-307861 | 11/1993 | Japan |
| 2176170 | 12/1986 | United Kingdom ............ 360/132 |
| 2243144 | 10/1991 | United Kingdom |

*Primary Examiner*—Stuart S. Levy
*Assistant Examiner*—Kevin M. Watkins
*Attorney, Agent, or Firm*—Michael N. Meller

[57] ABSTRACT

The present invention discloses a tape cassette having a front lid for protecting a magnetic face of a magnetic tape accommodated in a casing made of upper and lower half members against dust or the like, and a connecting plate and a rear lid suspended from the connecting plate for protecting an upper portion and a lower portion of the rear face of the magnetic tape respectively. The front lid is rotatably supported at sides of the casing. The rear lid is rotatably suspended on the connecting plate which is rotatably supported on the front lid. The magnetic tape is protected between the front lid and the rear lids together with the connecting plate in a lid closed state. A pair of pins provided on the rear lid are snugly fitted in a pair of guide grooves formed in protruding portions provided in the lower half member so that the rear lid may move in opening and closing directions. The guide grooves have open tops so that the pins of the rear lid are easily inserted into the guide grooves in the assembly process. The open tops are covered with front rims provided on the upper half member in the assembly process.

9 Claims, 8 Drawing Sheets

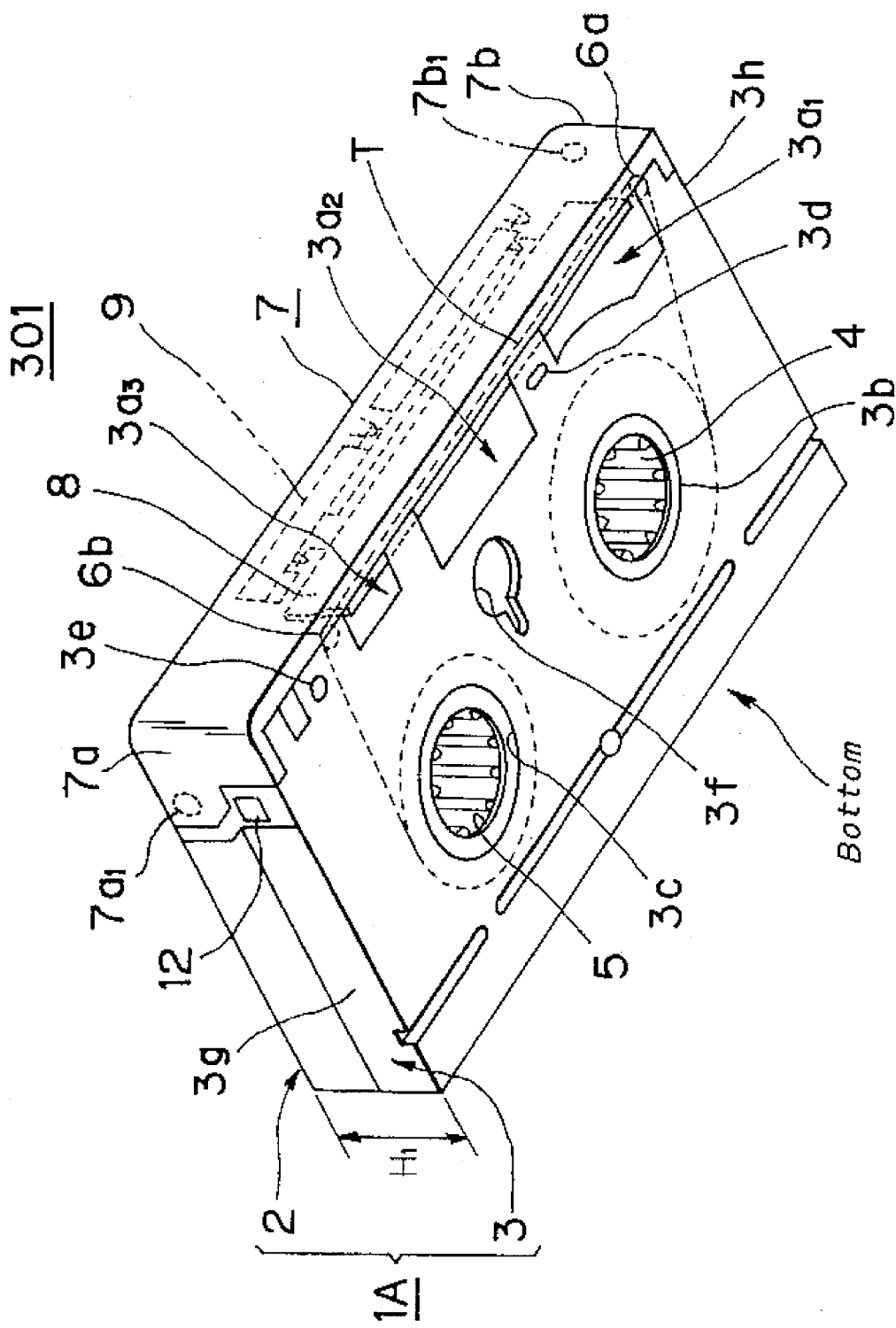

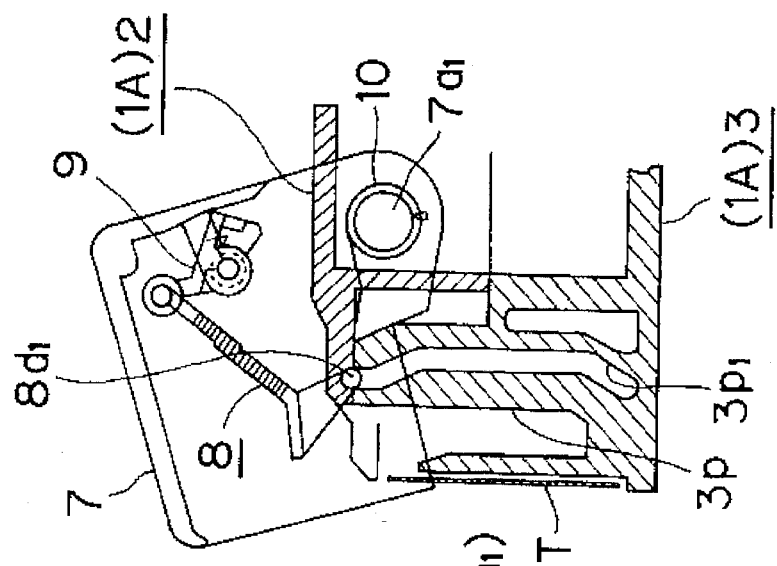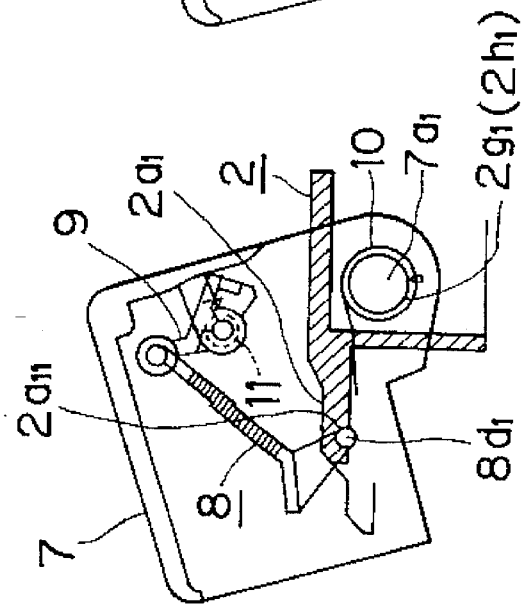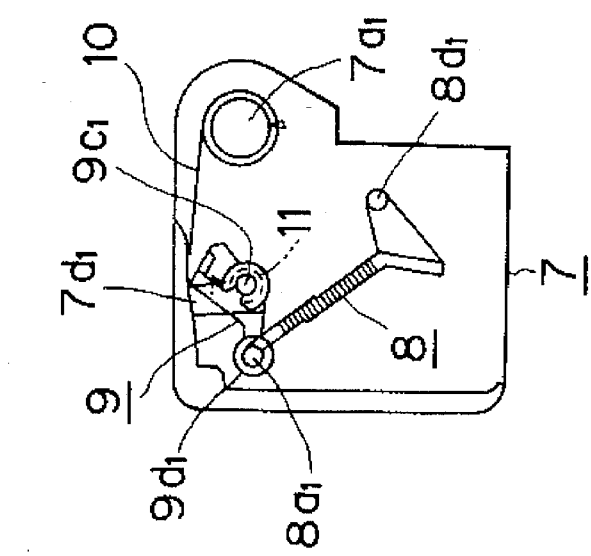

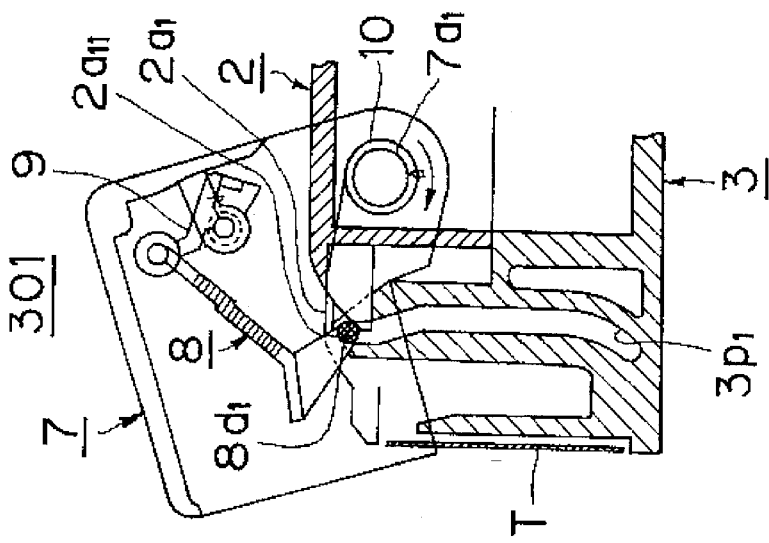
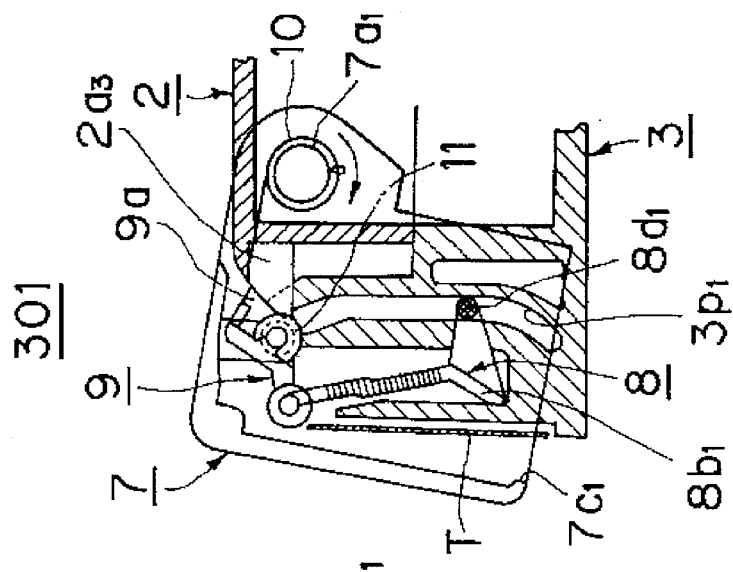
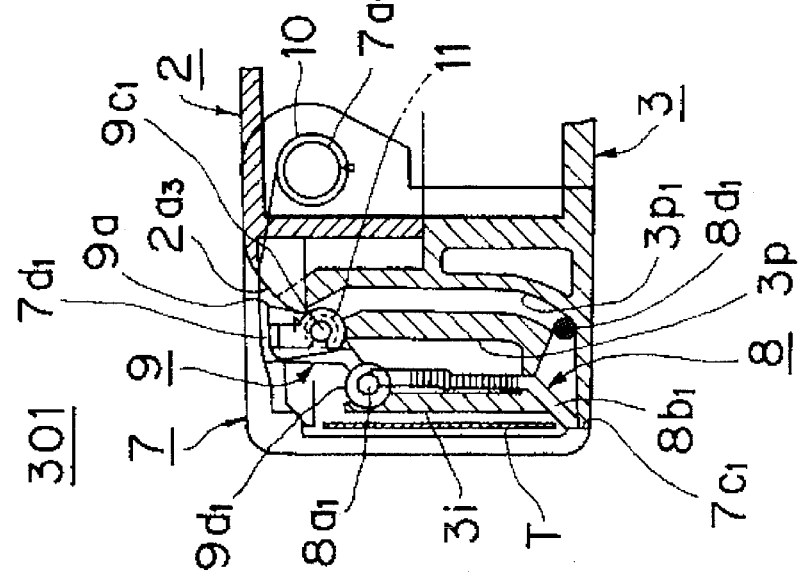

TAPE CASSETTE HAVING A REAR COVER COMPOSED OF TWO PIECES OF PLATES ROTATABLY CONNECTED TO EACH OTHER

BACKGROUND OF THE INVENTION

1. Field of the Invention

The present invention relates to a tape cassette for use with a magnetic recording and/or reproducing apparatus, and the present application is a Continuation-In-Part application from U.S. patent application Ser. No. 08/195,752 filed on Feb. 10, 1994 (now U.S. Pat. No. 5,453,896), which is a continuation-in-part application from U.S. patent application Ser. No. 08/980,978 filed on Nov. 24, 1992 (now U.S. Pat. No. 5,404,261). Both are assigned to the assignee of the present application. Particularly, the present invention relates to a tape cassette having front and rear lids for protecting a magnetic tape against dust and having its rear lid suspended from the front lid by means of a connecting plate.

2. Description of the Related Art

A tape cassette to be used with a magnetic recording and/or reproducing apparatus such as a video tape recorder is exemplified by a VHS standard tape cassette having a tape width of ½ inch, or by an 8 mm tape cassette having a tape width of 8 mm, as is well known in the prior art.

FIG. 1(A) is a perspective view of the VHS standard tape cassette; and FIG. 1(B) is a side view for explaining a lid opening action of the VHS standard tape cassette.

A VHS tape cassette 100, as shown in FIGS. 1(A) and 1(B), is assembled from an upper half member 101 and a lower half member 102 into a box-shaped casing. This VHS standard tape cassette 100 is used to perform recording and/or reproducing operations by not-shown magnetic recording and/or reproducing apparatuses. For these operations, the VHS standard tape cassette 100 has its external size and shape generally standardized to keep interchangeability with the apparatus.

Moreover, a magnetic tape T is made to move between a supply reel 103 and a take-up reel 104, which are disposed in the VHS standard tape cassette 100. The magnetic tape T wound on the supply reel 103 is guided around a supply side guide pole 105 and along a front lid 106 disposed at openings 102a of the lower half member 102 and is guided around a take-up side guide pole 107 so as to be taken-up on the take-up reel 104.

The openings $102a_1$–$102a_3$ of the lower half member 102 is opened at its bottom for permitting insertion of tape loading members (not-shown) of the apparatus.

On the other hand, the front lid 106 is provided for protecting the magnetic face of the magnetic tape T against dust and finger-prints or the like. This front lid 106 is so supported at the right-hand and left-hand sides of the tape cassette 100 that it can be opened or closed on a pair of pins 106a and 106a (although only one is shown) integrated with the inner side of the right-hand and left-hand sides of the front lid 106. However, the front lid 106 is retained and closed by a front lid lock member 108 disposed at the left-hand side of the tape cassette 100.

Referring to FIG. 1(B), only when the VHS standard tape cassette 100 is inserted into the magnetic recording and/or reproducing apparatus, the front lid lock member 108 is released by a lid opening device of the apparatus so that the front lid 106 is opened on the pins 106a formed on the front lid 106, as indicated by double-dotted lines. At this time, an opening angle $\theta_1$ of the front lid 106 is not too large for a small-sized, lightweight portable apparatus but is sufficiently large for a large-sized tape deck or professional-use apparatus.

With the front lid 106 being opened, the apparatus is loaded with the magnetic tape T along its predetermined tape path by the (not-shown) tape loading members entered into the openings $102a_1$–$102a_3$.

FIG. 2(A) is a perspective view of the 8 mm tape cassette of the prior art; and FIG. 2(B) is a side view for explaining a lid opening action of the 8 mm tape cassette.

On the other hand, the 8 mm tape cassette 200 as shown in FIG. 2(A) and 2(B), has a construction substantially similar to the aforementioned one and is assembled of upper and lower half members 201 and 202 into a box-shaped casing, which is equipped therein with a supply reel 203 and a take-up reel 204 for causing the magnetic tape T to move. At an opening 202a provided on the lower half member 202 and at the back of a front lid 205, there is disposed a rear lid 206 for protecting the back face of the magnetic tape T, the side opposite to the magnetic tape.

This 8 mm tape cassette 200 is disclosed in the Japanese Laid-Open Patent Publication No. 168979/1984. Here, a brief description is given of the vicinity of the front lid 205 and the rear lid 206. Along the front lid 205 which is disposed at the side of the opening 202a of the lower half member 202, there is guided the magnetic tape T which is protected while being interposed between the front lid 205 and the rear lid 206.

Specifically, the front lid 205 is so supported at the right-hand and left-hand sides of the upper and lower half members 201 and 202 that it can be freely opened or closed on a pair of pins 205a and 205a formed integrally with the inner walls of the right-hand and left-hand sides thereof. From the middle portion of the front lid 205, on the other hand, there concurrently depend a pair of projections 205b and 205b, which rotatably support the generally "T-shaped" rear lid 206 such that the rear lid 206 can rotate by means of a pair of pins 206a and 206a integrated therewith.

From the lower ends of the right-hand and left-hand sides of the rear lid 206, there are concurrently projected a pair of guide pins 206b and 206b. These guide pins 206b and 206b are fitted in a pair of guide grooves 202b and 202b which are formed in the right-hand and left-hand sides of the opening 202a of the lower half member 202.

Only when a not-shown magnetic recording and/or reproducing apparatus is loaded with the 8 mm tape cassette 200, as shown in FIG. 2(B), the front lid 205 and the rear lid 206 are opened together by a lid opening device of the apparatus, rotating around the supporting pins 205a formed on the front lid 205 which opens, as indicated by double-dotted lines.

Here, the rear lid 206 associatively with the opening action of the front lid 205 has to be opened to a position where the rear lid 206 does not contact the tape loading member for extracting the magnetic tape. However, a center of rotation of the rear lid 206 is in accordance with a common center line of the pair of pins 206a each projecting from a respective side thereof, thus, the rear lid 206 has only one phase in freedom of motion in the lid opening action, which requires the front lid to be opened through large-angle.

In recent years, the magnetic tape T is required to undergo the recording and/or reproducing operations in a high density with excellent performance quality. At the present stage, moreover, the recording and reproducing operations can be digitally effected, the recording and/or reproducing qualities are apt to be seriously deteriorated if the magnetic tape T becomes dusty or is stained with fingerprints as well as foreign objects from the openings $102a_1$–$102a_3$.

It is, therefore, considered that a member corresponding to the disclosed rear lid (206) of the aforementioned 8 mm tape cassette 200 is attached to the VHS tape cassette 100. However, the not-shown magnetic recording and/or reproducing apparatus adopting the VHS tape cassette 100 has already been widely used in the relevant field. Considering the interchangeability between the VHS tape cassette 100 and the apparatus, the following serious problems (1)–(3) will arise to the users if the construction of the 8 mm tape cassette 200 is applied to the VHS tape cassette 100 in its present form. Thus, it is difficult to adopt the member corresponding to the rear lid (206) into the existing construction.

(1) When the member corresponding to the rear lid (206) of the aforementioned construction of the 8 mm tape cassette 200 is adopted in its present form, the lid opening and closing actions of the member corresponding to the rear lid associatively with the opening action of the front lid 205 are difficult to be done smoothly. Alternatively, there may be considered another method that the member corresponding to the rear lid (206) is suspended from the front lid 205 by using connecting means, wherein there is a problem to be solved, i.e., how to completely cover the back face of the magnetic tape.

(2) In the apparatus such as a portable video deck or a video movie, the front lid has its open angle designed to the minimum so as to reduce the size. In case, therefore, the member corresponding to the rear lid (206) of the aforementioned construction of the 8 mm tape cassette 200 is adopted, that member can not be opened sufficiently and will collide with the tape loading members for extracting the magnetic tape T into the apparatus.

(3) In the apparatus of the type such as a large-sized video deck or a video deck for professional use, on the other hand, the open angle of the front lid is designed to a sufficient value. In case, therefore, the member corresponding to the rear lid (206) of the construction of the aforementioned 8 mm tape cassette 200, the guide pins (206b, 206b) of the member corresponding to the rear lid (206) will come upward out of the guide grooves (202b, 202b) and be damaged when the member corresponding to the rear lid (206) is closed.

In summary, the rear lid opening/closing structure associated with the front lid has to be constructed so that the rear lid is connected to the front lid by means of the connecting plate not only to increase phases in freedom of motion but also to completely cover the back face of the magnetic tape with the rear lid together with the connecting plate. Further, when the rear lid is sufficiently opened associatively with the opening action of the front lid, the guide pins provided on the rear lid have to be prevented from coming off the open tops of the guide grooves. Furthermore, in the assembly process, when the upper half member temporarily fabricated with front lid provided with the rear lid by means of the connecting plate is assembled into the casing, the guide pins of the rear lid have to be securely fitted in the guide grooves in efficient manners without contacting the magnetic tape, no matter how much its external shape might be different. Thus, there has been desired a tape cassette which can satisfy those conditions.

SUMMARY OF THE INVENTION

Accordingly, a general object of the present invention is to provide a novel and useful tape cassette in which the above disadvantage has been eliminated.

A more specific object of the present invention is to provide a tape cassette having a casing for accommodating a pair of reels disposed in the casing for winding a magnetic tape on the pair of reels and threading the magnetic tape along a front of the casing, a front lid disposed in openable/closable manners at the front of the casing for protecting a front face of the magnetic tape and a rear lid disposed at a back side of the front lid for protecting a back face of the magnetic tape, wherein the tape cassette comprises, plate supporting means provided on an upper side of the front lid, a connecting plate having arm member means and first pin means for rotatably supporting the connecting plate on the plate supporting means of the front lid to protect an upper portion of the back face of the magnetic tape when the front lid is closed, the rear lid comprising second pin means and guide pin means for operating in cooperation with opening and closing actions of the front lid, the rear lid being suspended from the connecting plate by causing the second pin means to engage with the arm member means of the connecting plate to protect a lower portion of the back face of the magnetic tape, guide groove means provided in the casing for slidably guiding the guide pin means in the lid opening and closing directions by being engaged with the guide pin means of the rear lid, first biasing means for biasing the front lid in lid opening direction, second biasing means for displacing the rear lid in the lid opening direction by biasing the connecting plate toward a direction of the upper side of the front lid, and rear lid restricting means for restricting an opening action of the rear lid biased in the lid opening direction by the second biasing means when the front lid is closed.

Another specific object of the present invention is to provide a tape cassette having a casing comprising an upper half member and a lower half member for accommodating a pair of reels disposed in the casing for winding a magnetic tape on the pair of reels and threading the magnetic tape along opening means, a front lid disposed in openable/closable manners at the front of the casing for protecting a front face of the magnetic tape and a rear lid disposed at a back side of the front lid for protecting a back face of the magnetic tape, wherein said tape cassette comprises, the opening means defined in a front of the lower half member for allowing insertion of tape loading members of a recording and reproducing apparatus, and a pair of tape guides for guiding the magnetic tape therealong, the pair of tape guide projecting outwardly from a wall of the lower half member in the opening means in such a manner that the opening means is divided into three openings.

BRIEF DESCRIPTION OF THE DRAWINGS

FIG. 3 is a perspective view showing an entire construction of a tape cassette according to the present invention;

FIG. 6(A) is a cross-sectional view for explaining an assembly of main parts of the present invention, wherein the rear lid and the connecting plate are attached to the front lid;

FIG. 6(B) is a cross-sectional view for explaining an assembly of main parts of the present invention, wherein the front lid is attached to an upper half member;

FIG. 6(C) is a cross-sectional view for explaining an assembly of main parts of the present invention, wherein the front lid is attached to a lower half member;

FIG. 8(A) is a cross-sectional view for explaining lid opening and closing actions of the tape cassette, wherein the front lid, the rear lid and the connecting plate are closed;

FIG. 8(B) is a cross-sectional view for explaining lid opening and closing actions of the tape cassette, wherein the front lid, the rear lid and the connecting plate are on the way to the opening state; and FIG. 8(C) is a cross-sectional view for explaining lid opening and closing actions of the tape cassette, wherein the front lid is fully opened, and the pin of the rear lid comes to the open top of the guide groove of the lower half member.

DETAILED DESCRIPTION OF THE PREFERRED EMBODIMENTS

The tape cassette according to the present invention will be described in the following in connection with the embodiments thereof with reference to FIGS. 3 to 8(C). This description will be made in detail individually for the embodiments in the order of the items of <Construction of Tape Cassette> and <Lid Opening Action of Tape Cassette>.

<Construction of Tape Cassette>

Figure 1A:
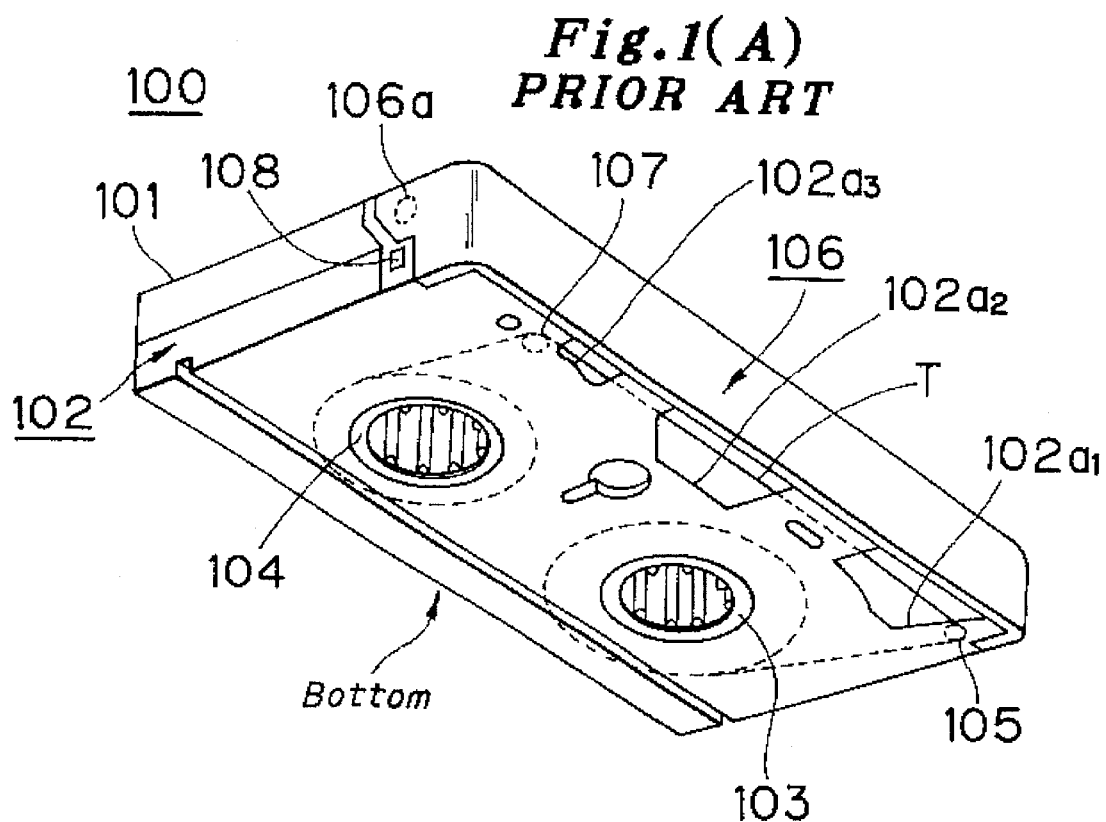
FIG. 1(A) is a perspective view of the VHS standard tape cassette of the prior art.
Figure 1B:
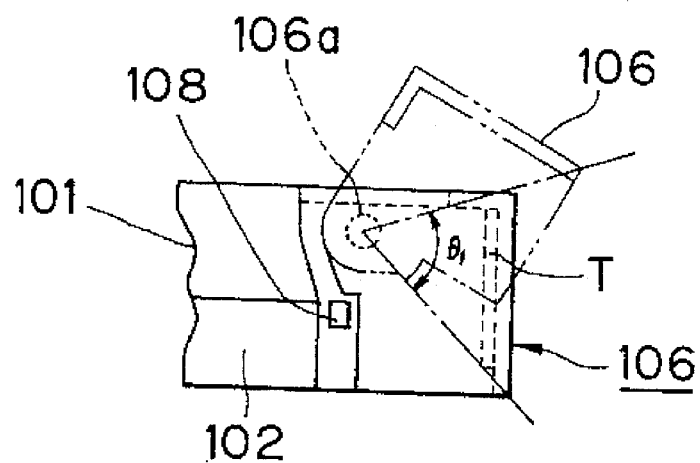
FIG. 1(B) is a side view for explaining a lid opening action of the VHS standard tape cassette of FIG. 1(A)
Figure 2A:
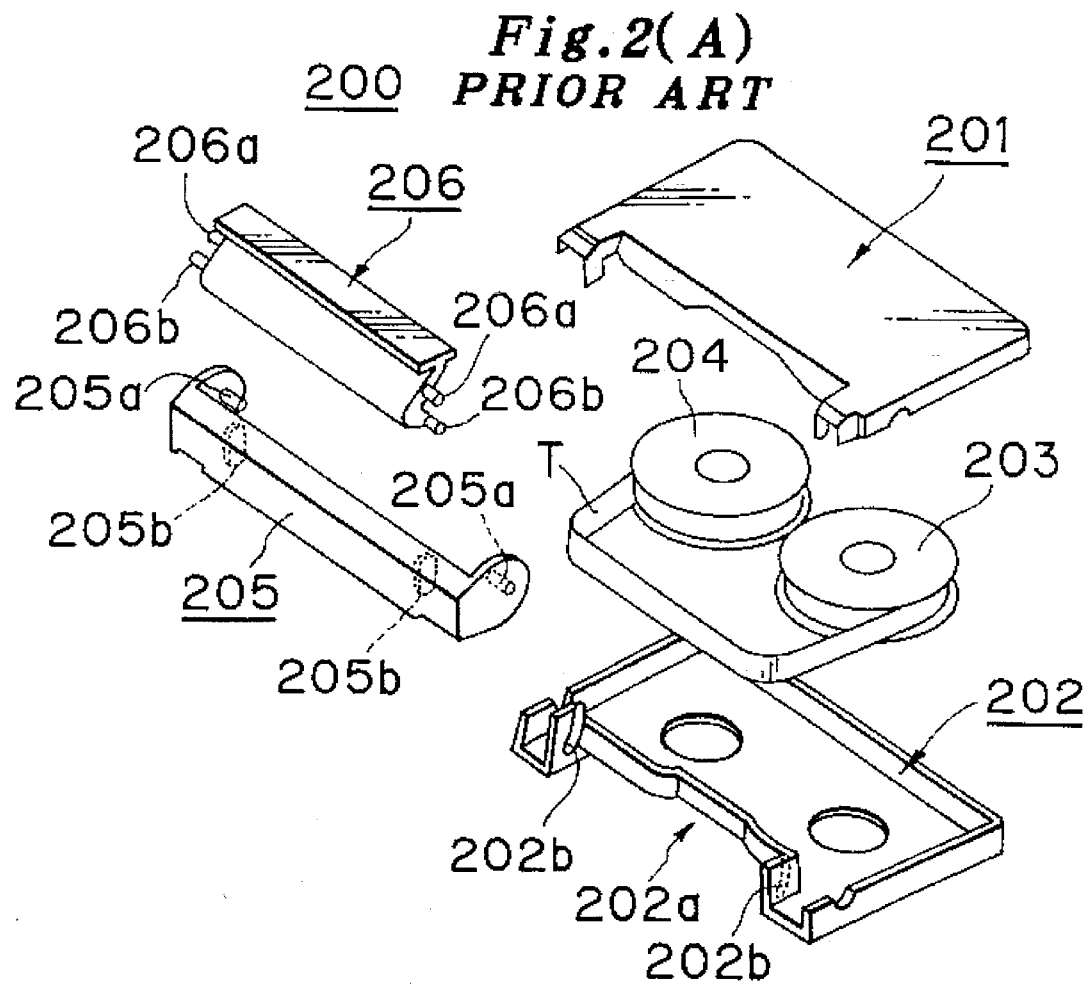
FIG. 2(A) is an exploded perspective view of the 8 mm tape cassette of the prior art.
Figure 2B:
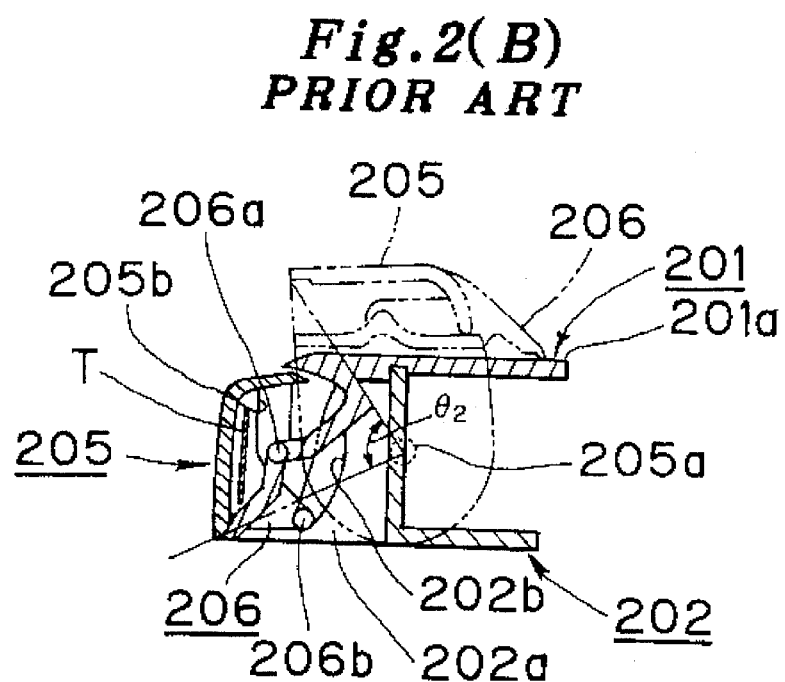
FIG. 2(B) is a side view for explaining a lid opening action of the 8 mm tape cassette of FIG. 2(A)
Figure 4:
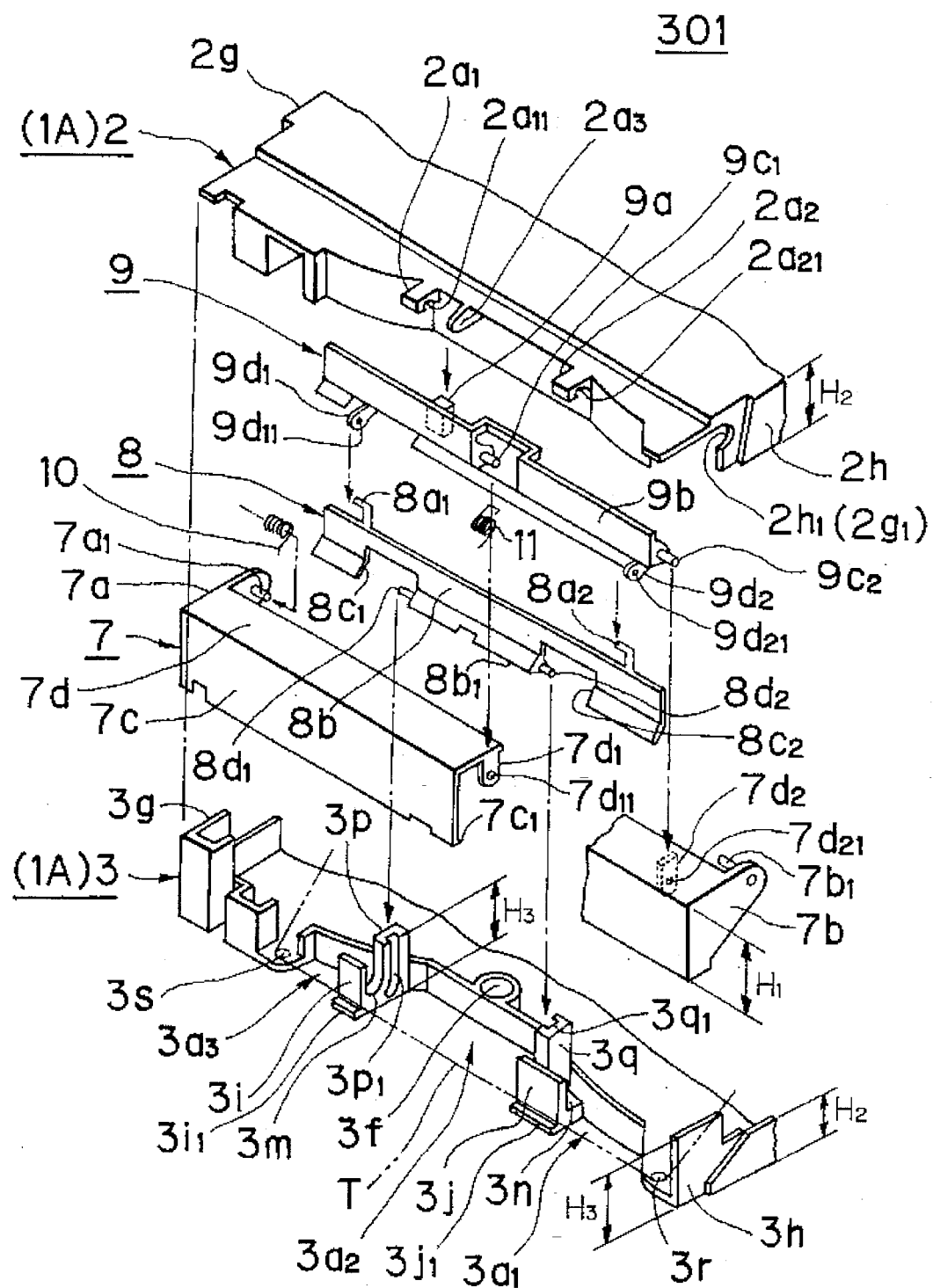
FIG. 4 is, partially broken, an exploded perspective view showing a front lid, a rear lid and a connecting plate together with their vicinity constituting essential parts of the tape cassette according to the present invention.
Figure 5:
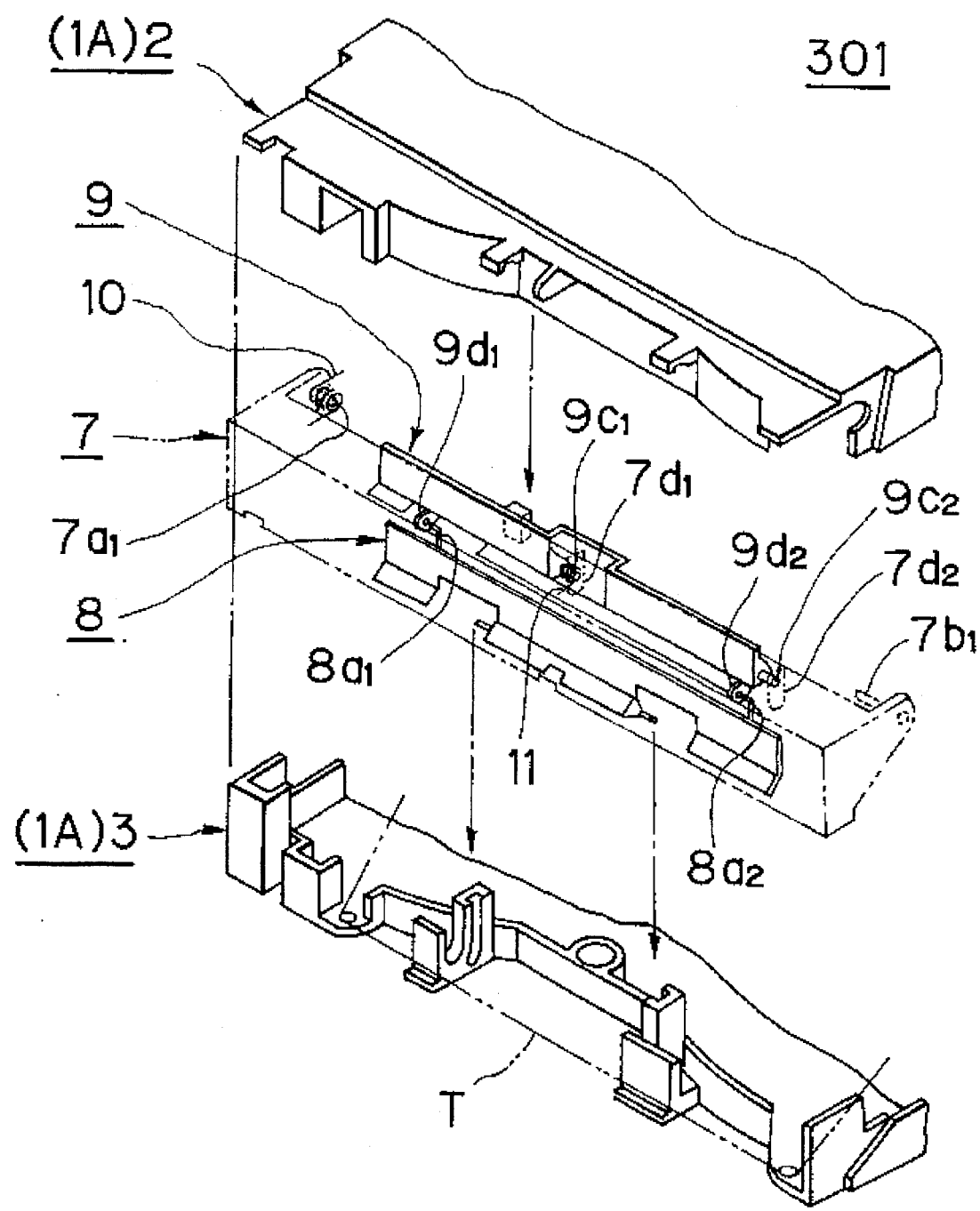
FIG. 5 is a partially broken exploded perspective view showing a state where the rear lid and the connecting plate are attached to the front lid.
Figure 7:
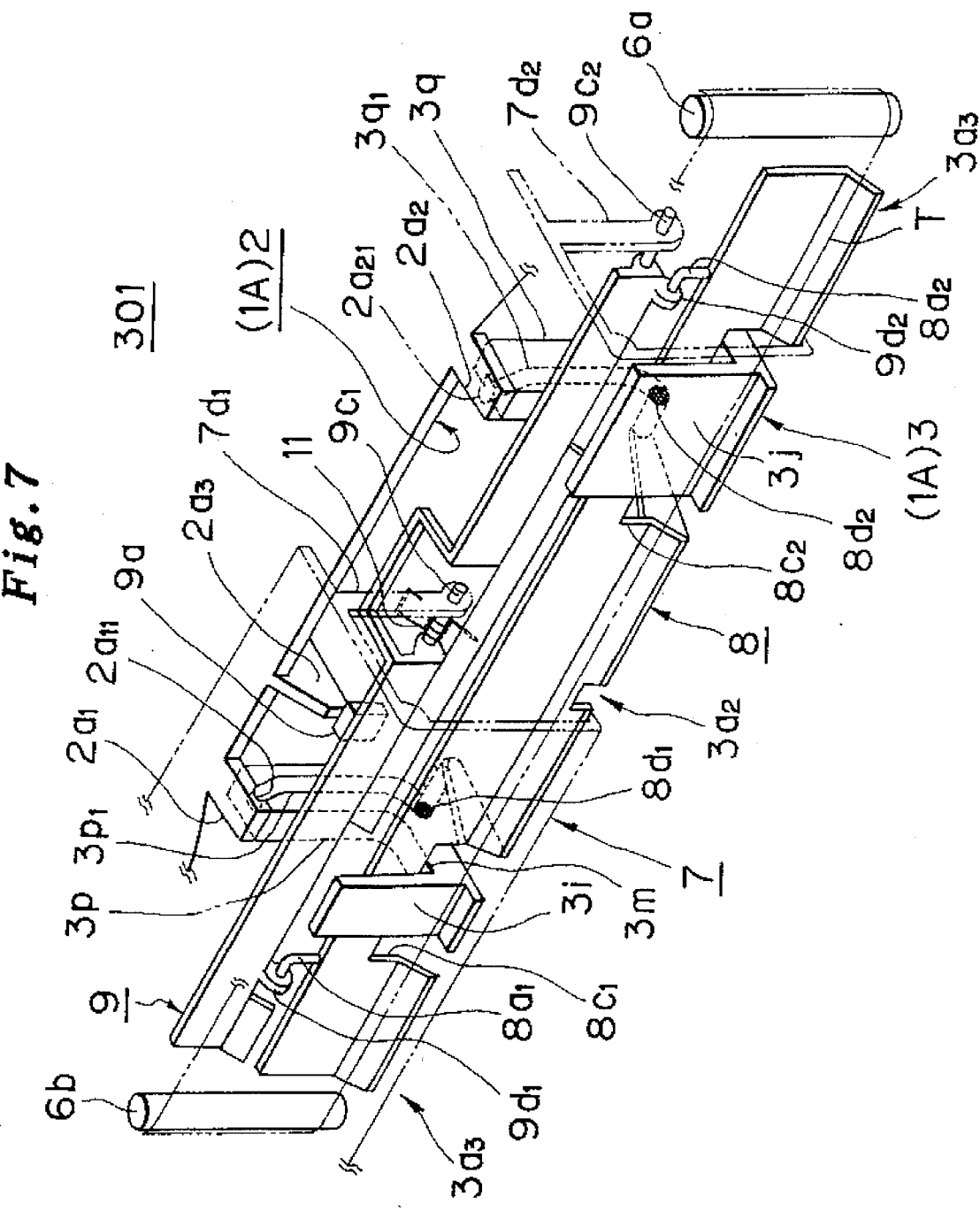
FIG. 7 is, partially broken, a partial perspective view showing, in an assembled state, the tape cassette where the front lid attached with the connecting plate and the rear lid is assembled in a casing.

FIG. 3 is a perspective view showing an entire construction of a tape cassette according to the present invention; FIG. 4 is, partially broken, an exploded perspective view showing a front lid, a rear lid and a connecting plate together with their vicinity constituting essential parts of the tape cassette according to the present invention; FIG. 5 is a partially broken exploded perspective view showing a state where the rear lid and the connecting plate are attached to the front lid; FIG. 6(A) is a cross-sectional view for explaining an assembly of main parts of the present invention, wherein the rear lid and the connecting plate are attached to the front lid; FIG. 6(B) is a cross-sectional view for explaining an assembly of main parts of the present invention, wherein the upper half member having the front lid is attached to an upper half member; FIG. 6(C) is a cross-sectional view for explaining an assembly of main parts of the present invention, wherein the front lid is attached to a lower half member; and FIG. 7 is, partially broken, a partial perspective view showing, in an assembled state, the tape cassette where the front lid attached with the connecting plate and the rear lid is assembled into a casing.

A tape cassette 301 of the present invention, as shown in FIG. 3, is divided into an upper half member 2 and a lower half member 3 of a resin material such that the upper half member 2 and the lower half member 3 are assembled into a box-shaped casing 1A. This casing 1A is equipped therein with a supply reel 4 and a take-up reel 5, between which a magnetic tape T is provided to move. The magnetic tape T wound on the supply reel 4 is guided, after having passed around a guide pole 6a (as clearly shown in FIG. 3) at a supply side, through a gap between a front lid 7 and a rear lid 8, which are disposed at a front side of openings $3a_1$–$3a_3$ provided at a bottom of the lower half member 3, and is taken up by the take-up reel 5 after having passed a guide pole 6b at a take-up side.

In addition to these openings $3a_1$–$3a_3$, the lower half member 3 is provided on its bottom: with holes 3b and 3c, which are aligned correspondingly with the supply reel 4 and the take-up reel 5: with positioning holes 3d and 3e located in the vicinity of the opening 3a for positioning the tape cassette 301 in the apparatus: and with a hole 3f for accepting a light emitting element (not-shown) for detecting the loaded state of the magnetic tape T.

The aforementioned front lid 7 provided at a front of casing 1A is supported in openable and closable manners on the left-hand and right-hand sides 3g and 3h of the casing 1A by means of a pair of pins $7a_1$ and $7b_1$ (although only the pin $7a_1$ is explicitly shown) which are formed integrally with the inner walls of the right-hand and left-hand sides 7a and 7b of the front lid 7. Before the apparatus is loaded with the tape cassette 301, the front lid 7 is retained by a front lid lock member 12 which is disposed on the left-hand side 3g of the lower half member 3, so that it is kept in a closed state.

Incidentally, the opening action of the front lid 7 is allowed only when the tape cassette 301 is loaded into the (not-shown) magnetic recording and/or reproducing apparatus. At this time, the front lid lock member 12 is released by a lid opening device of the apparatus to allow the front lid 7 to be opened, but a detailed description is omitted here.

Behind the front lid 7, the aforementioned rear lid 8 is suspended from a connecting plate 9 provided on the front lid 7 in such manner that both the rear lid 8 and the connecting plate 9 oppose a back face of the magnetic tape T which is extendingly interposed between the front lid 7 and the rear lid 8 connected to the connecting plate 9 along the back of the front lid 7. The rear lid 8 and the connecting plate 9 are integrally operable in openable and closable manners in cooperation with the front lid 7. When the front lid 7 is closed, a magnetic face or a front face of the magnetic tape T is protected by being covered with the front lid 7 and concurrently, upper and lower portions of the back face of the magnetic tape T are respectively protected by being covered with the connecting plate 9 and the rear lid 8.

Thus, the rear lid 8 and the connecting plate 9 protect the back face of the magnetic tape T against the dust invading from the openings $3a_1$–$3a_3$ provided on the lower half member 3. They further protect the magnetic tape T itself from being scratched by fingers or foreign objects which may come through the opening 3a.

The above mentioned tape cassette 301 of the present invention is constructed to keep an interchangeability with an industry standard VHS tape cassette. However, it is not limited to the standard VHS tape cassette but is adaptable to any kind of tape cassettes having moderate size configurations.

Next, a detailed description is given to major structural members constituting the essential portions of the present invention referring to FIG. 4.

As shown in FIG. 4, with some exceptional portions the upper half member 2 and the lower half member 3 are individually formed and are separated at a height $H_2$ from a bottom of the lower half member 3, which is about one half of the height $H_1$ of the front lid 7 being substantially equal to that of the tape cassette 301.

Further, the upper half member 2 is formed with protruding front rims $2a_1$, $2a_2$, each having a thin thickness, being separated from each other at a predetermined distance at the front thereof. The front rims $2a_1$, $2a_2$ are respectively provided with engagement recess as $2a_{11}$, $2a_{21}$ (explicitly shown in FIG. 6(B))at bottoms thereof. The engagement recesses $2a_{11}$, $2a_{21}$ are respectively connected to open tops of guide grooves $3p_1$, $3q_1$ provided in protruding portions $3p$, $3q$ of the lower half member 3 as described hereafter.

Thanks to the above construction, the assembly of the tape cassette is made easy, in particular, when the upper half member 2 temporarily assembled with the front lid 7 provided with the rear lid 8, is attached to the lower half member 3 as described hereafter.

Moreover, a protruding guide $2a_3$ for guiding the connecting plate 9 is formed in a tapered shape in front of the upper half member 2 between the left-hand and the right-hand front rims $2a_1$, $2a_2$. The guide $2a_3$ is detachably contacted with a cam $9a$ provided at a back surface of the connecting plate 9 supported by the front lid 7. When the front lid 7 is closed by a biasing force of a first biasing member 10 (referred to as torsion spring 10) provided on a pin $7a_1$ of the front lid 7 for biasing the front lid 7 in a lid closing direction, the connecting plate 9 is biased in a lid opening direction by a second biasing member 11 (referred to as torsion spring 11) for biasing the connecting plate 9 in a direction of the bottom of an upper plate $7d$ provided in the front lid 7, i.e., in a clockwise direction. However, the connecting plate 9 is restricted from moving and keeps a closed state against the biasing force of the torsion spring 11 by causing the cam $9a$ thereof to abut on the guide $2a_3$ of the upper half member 2. Concurrently, the rear lid 8 suspended from the connecting plate 9 is also biased in the lid opening direction by the torsion spring 11, but keeps a closed state subjected to the action of the connecting plate 9 against the torsion spring 11 as well.

Thus, the guide $2a_3$ of the upper half member 2 and the cam $9a$ of the connecting plate 9 constitute a rear lid restricting tool for restricting the opening action of the rear lid 8 connected to the connecting plate 9 when the front lid 7 is closed.

Next, front portions of the left-hand and right-hand sides $3g$, $3h$ of the lower half member 3 respectively have a height $H_3$ slightly lower than the height $H_1$ of the front lid 7 and the rear portions of the left-hand and right-hand sides $3g$, $3h$ have a height $H_2$.

The upper half and lower half members 2, 3 are assembled into the casing 1A supporting the front lid 7 thereby, as follows. After the torsion spring 10 is inserted into the pin $7a_1$ of the front lid 7, the front lid 7 is supported by the upper half member 2 by causing the pins $7a_1$, $7b_1$ of the front lid 7 to be inserted into holes $2g_1$, $2h_1$ having open ends each defined at the left side $2g$ and the right side $2h$ of the upper half member 2. Then, the upper half member 2 is assembled into the casing 1A by causing peripheral portions thereof to abut on peripheral portions of the lower half member 3. Thus, the front lid 7 is supported in the openable and closable manners in front of the casing 1A thereby.

Further, nearby both sides of an opening $3a_2$ defined in front of an approximate center of the lower half member 3, tape guides $3i$, $3j$ projecting from a wall of the lower half member 3 for guiding the magnetic tape T are protrudingly and integrally provided in a plate shape separated at a predetermined distance. These tape guides $3i$, $3j$ are slightly higher than the height $H_2$ of the lower half member 3. These tape guides $3i$, $3j$ have a function to prevent the magnetic tape T from coming into close contact with the rear lid 8 and the connecting plate 9 due to static electricity. Further, these tape guides $3i$, $3j$ are defined with recesses $3m$, $3n$ therebehind to cause cutouts $8c_1$, $8c_2$ formed in the rear lid 8 to mount therein as described hereafter.

Further, these tape guide $3i$, $3j$ are provided with tape guide rims $3i_1$, $3j_1$ at lower ends thereof for preventing the magnetic tape T from slipping off from the tape guides $3i$, $3j$.

Moreover, the tape guides $3i$, $3j$ are integrally provided with a pair of protruding portions $3p$ and $3q$ therebehind, respectively, in conjunction with the recesses $3m$, $3n$ so that the paired protruding portions protrude upward to have a height $H_3$ slightly lower than the height $H_1$ of the front lid 7. The paired protruding portions $3p$, $3q$ are provided with a pair of opposing guide portions $3p_1$ and $3q_1$ (as will be referred to as the "guide grooves") which are "boot-shaped" grooves each having an open top in the lid opening direction and a closed bottom in the lid closing direction, respectively. In these paired guide grooves $3p_1$ and $3q_1$, there can be snugly and slidably fitted (in engagement) guide pins $8d_1$ and $8d_2$ which are formed on the rear lid 8.

In assembly process, after the guide pins $8d_1$, $8d_2$ of the rear lid 8 are inserted into the paired guide grooves $3p_1$, $3q_1$ having the open tops thereof, the open tops of the guide grooves $3p_1$, $3q_1$ are covered by the front rims $2a_1$, $2a_2$ of the upper half member 2 by causing the upper half member 2 to be placed in stacked manner on the lower half member 3. Thus, the guide pins $8d_1$, $8d_2$ of the rear lid 8 are prevented from coming off the open tops of the paired guide grooves $3p_1$, $3q_1$. Thus, the rear lid 8 of the present invention is easily assembled into the tape cassette 301, thanks to the provision of the open top of the paired guide grooves $3p_1$, $3q_1$, and is sufficiently opened in operation without slipping off from the paired guide grooves $3p_1$, $3q_1$ and the front rims $2a_1$, $2a_2$ of the upper half member 2 for covering the open tops.

Further, the guide grooves $3p_1$, $3q_1$ for guiding the guide pins $8d_1$, $8d_2$ are provided nearby innermost portions of the opening $3a_2$ defined approximately in front of the center of the lower half member 3, thus, the lid opening and closing operations can be performed without disturbing the tape loading members of the apparatus by causing the rear lid 8 and the connecting plate 9 to be kept parallel to the front lid 7.

The lower half member 3 is defined with holes $3r$, $3s$ for installing the guide poles $6a$, $6b$ shown in FIG. 7. The magnetic tape T is extendingly disposed between the guide poles $6a$, $6b$ fitted in the holes $3r$, $3s$ as shown with double-dotted lines.

Next, the front lid 7 is provided with a front plate $7c$ connected perpendicularly to the upper plate $7d$ downward between a left-hand plate $7a$ and a right-hand plate $7b$ thereof, forming an "inverted L-shape" in cross section. The front plate $7c$ has its lower end slightly extended backward to form a triangular (sectional view) portion $7c_1$. The triangular portion $7c_1$ has a function to cover the lower end of the magnetic tape T, which is disposed along the back surface of the front lid 7, in a sealed state together with a later-described lower end portion $8b_1$ of the rear lid 8, when the front lid 7 is closed. Thus, the triangular portion $7c_1$ protects the magnetic tape T in a state isolated from the openings $3a_1$–$3a_3$.

At the back side of the front lid 7, on the other hand, there depends from a bottom of the back of the upper plate $7d$, connecting plate supporting portions $7d_1$, $7d_2$ (as will be referred to as the "plate supporting portion $7d_1$, $7d_2$")

separated at a predetermined distance. The plate supporting portions $7d_1$, $7d_2$ are defined with holes $7d_{11}$, $7d_{21}$, respectively, for rotatably supporting the connecting plate 9.

Next, the connecting plate 9 of the main part of the present invention is disposed under the bottom of the upper plate $7d$ of the front lid 7 and has a function to protect the upper portion of the back face of the magnetic tape T disposed along the back surface of the front lid 7 by covering it. The connecting plate 9 made of resin is formed so as to have a width approximately the same as the rear lid 8, and so as to have an "inverted L-shape" at the front $9b$ opposite the back surface of the front lid 7.

Moreover, the aforementioned cam $9a$ projects from the back surface of the connecting plate $9a$ pair of left-hand and right-hand pins $9c_1$, $9c_2$ are integrally provided at a wall of a hollow mass portion which defines a hollow portion and with a distal end of the connecting plate 9, respectively, so as to face horizontally in a right-hand direction. Thus, the connecting plate 9 can be rotatably and horizontally supported by the front lid 7 along the back surface of the front lid 7 by causing the left-hand pin $9c_1$ with the torsion spring 11 to be inserted into the hole $7d_{11}$ of the plate supporting portion $7d_1$ and by causing the right-hand pin $9c_2$ to be inserted into the hole $7d_{21}$ of the plate supporting portion $7d_2$. Incidentally, a distal end of the torsion spring 11 is engaged with the plate supporting portion $7d_1$, and another distal end of the torsion spring 11 is engaged with the back surface of the connecting plate 9. Thus, the torsion spring 11 forces the connecting plate 9 in the bottom surface direction of the upper plate $7d$ of the front lid 7 and the rear lid 8 suspended from the connecting plate 9 in the lid opening direction.

Incidentally, a U-shaped reinforcement frame is provided around the hollow mass portion of the connecting plate 9.

Further, an arm $9d_1$ is protrudingly provided in a slant downward direction from a wall of a left-hand cutout and an arm $9d_2$ is provided in the same manner at a right-hand distal end, of the connecting plate 9. The arms $9d_1$ and $9d_2$ are respectively formed with holes $9d_{11}$, $9d_{21}$, horizontally. The rear lid 8 is suspended from the arms $9d_1$, $9d_2$ by causing the pins $8a_1$, $8a_2$ thereof to be inserted into the abovementioned holes $9d_{11}$, $9d_{21}$.

Next, the rear lid 8 of the present invention has a function to protect the back face and the under portion of the magnetic tape T disposed along the back surface of the front lid 7 by covering the under portion thereof.

The above rear lid 8 is formed by using resin to have enough length in a longitudinal direction to cover the openings $3a_1$–$3a_3$ at a lower portion thereof by causing the lower portion to be inserted into the openings $3a_1$–$3a_3$, and a front side $8b$ of the rear lid 8 facing the back surface of the front lid 7 has an inverted L letter-shape in a height direction.

Further, a pair of pins $8a_1$, $8a_2$ project horizontally in the inverted L-shape from the upper portion nearby both sides of the rear lid 8. The rear lid 8 is rotatably suspended from the connecting plate 9 by causing the paired pins $8a_1$, $8a_2$ to be inserted into the holes $9d_{11}$, $9d_{21}$ of the arms $9d_1$, $9d_2$ provided on the connecting plate 9. Further, a pair of cutouts $8c_1$, $8c_2$ are formed at an under portion of the rear lid 8 separated at a predetermined distance, and each of the guide pins $8d_1$, $8d_2$ protrudes horizontally in an opposite direction from a wall of the respective cutouts $8c_1$, $8c_2$.

These pins $8d_1$, $8d_2$ are slidably fitted with the guide grooves $3p_1$, $3q_1$, respectively, formed in the protruding portions $3p$, $3q$ of the lower half member 3 as mentioned in the foregoing.

Incidentally, parts of the cutouts $8c_1$, $8c_2$ of the rear lid 8 are formed to be allowed to freely enter into the recesses $3m$, $3n$ of the lower half member 3 without abutting thereon. When the front lid 7 is closed, the lower end portion $8b_1$ except for the cutouts $8c_1$, $8c_2$ protects the lower portion of the magnetic tape T in a wrapping manner by abutting on the inner wall of the triangular portion $7c_1$ of the front lid 7.

As mentioned above, when the rear lid 8 is connected to the front lid 7 by using the connecting plate 9, the rear lid 8 is rotated on the two pairs of rotating pins consisting of the paired pins ($9c_1$, $9c_2$) connecting the connecting plate 9 to the front lid 7 and the paired pins ($8a_1$, $8a_2$) connecting the connecting plate 9 to the rear lid 8, thus, the rear lid 8 has two degrees of freedom of motion in link mechanism, which enables the connecting plate 9 and the rear lid 8 to be opened and closed smoothly parallel to the front lid 7 in cooperation with the front lid 7.

Next, a description is given to an assembly process of the tape cassette 301 using the aforementioned major components referring to FIGS. 5–7. Reference characters shown in FIGS. 6(A)–6(C) show those of left-hand components with respect to a center line, and the description of those of the right-hand components which are symmetrical to those of the left-hand ones are omitted.

Referring to FIGS. 5 and 6(A), at first, the torsion spring 10 is inserted into the the pin $7a_1$ of the front lid 7. After the torsion spring 11 is inserted into the pin $9c_1$ of the connecting plate 9, the connecting plate 9 is rotatably supported on the front lid 7 by causing the pin $9c_1$ to be supported with plate supporting portion $7d_1$ of the front lid 7. Further, the rear lid 8 is suspended from the connecting plate 9 by causing the pin $8a_1$ of the rear lid 8 to be supported with the arm $9d$ of the connecting plate 9. Thus the rear lid 8 is connected to the front lid by means of the connecting plate 9.

Next, referring to FIG. 6(B), the front lid 7 is temporarily assembled to the upper half member 2.

In this process, after the pin $7a_1$ of the front lid 7 is inserted into the open end hole $2g_1$ of left side of the upper half member 2 from a front direction, the front lid 7 is displaced upward to open and is held at that position manually against the torsion spring 10.

In cooperation with the above action, since the rear lid 8 is also displaced upward, the front lid 7 is temporarily fabricated to the upper half member 2 by causing the guide pin $8d_1$ of the rear lid 8 to be engaged with the engagement recess $2a_{11}$ of the upper half member 2 manually.

Next, as shown in FIG. 6(C), the upper half member 2 is assembled to the lower half member 3 keeping a state where the guide pin $8d_1$ is engaged with the engagement recess $2a_{11}$. Incidentally, since the magnetic tape T is accommodated in the lower half 3 in advance, the upper half member 2 carrying the front lid 7 and the rear lid 8 in a lid opened state is safely and securely assembled to the lower half member 3 without causing the front and rear lids 7, 8 to contact the magnetic tape T.

In this stage, the front rim $2a_1$ of the upper half member 2 abuts on the upper end portion of the protruding portion $3p$, connecting the engagement recess $2a_{11}$ to the open top of the guide groove $3p_1$. Therefore, the guide pin $8d_1$ of the rear lid 8 is guided by the guide groove $3p_1$ without coming off from the open top of the guide groove $3p_1$, which enables a speedy and secure assembly to be performed and contributes to increase the reliability and quality of the tape cassette 301.

When the guide pin $8d_1$ of the rear lid 8 is manually released from the engagement recess $2a_{11}$, the front lid 7 is rotated downward to close by the biasing force of the torsion spring 10. Thus, the guide pins $8d_1$, $8d_2$ of the rear lid 8 descend along the guide grooves $3p_1$, $3q_1$ in cooperation with the closing action of the front lid 7, as shown in FIG. 7. Thus, the assembly of the tape cassette 301 is completed.

In this tape cassette assembled state, the magnetic tape T is extended along the tape guides $3i$, $3j$ from the guide pole $6a$ of the supply side to the guide pole $6b$ of the take-up side. The front face of the magnetic tape T is protected by being covered with the front lid 7 and the upper and lower portions of the rear face thereof are respectively protected by being covered with the connecting plate 9 and the rear lid 8.

Incidentally, rotational movement of the connecting plate 9 is restricted by the cam $9a$ provided at the back surface of the connecting plate 9 to abut on the guide $2a_3$ protrudingly provided on the upper half member 2 in the tapered shape, so that the connecting plate 9 is held in a closed state against the biasing force of the torsion spring 11.

Further, the guide pins $8d_1$, $8d_2$ of the rear lid 8 suspended from the connecting plate 9 come to the lower ends of the guide grooves $3p_1$, $3q_1$ of the protruding portions $3p$, $3q$ provided on the lower half member 3, and the rear lid 8 is held in the closed state by being subjected to the closed state of the connecting plate 9. The rear lid 8 and the connecting plate 9 are prevented from displacing in the right and left directions toward the front lid 7 by being connected to one another.

<Lid Opening Action of Tape Cassette>

A description is given to lid opening and closing actions of the tape cassette 301 referring to the FIGS. 7 and 8(A)–8(C).

FIG. 8(A) is a cross-sectional view for explaining lid opening and closing actions of the tape cassette, wherein the front lid, the rear lid and the connecting plate are closed; FIG. 8(B) is a cross-sectional view for explaining lid opening and closing actions of the tape cassette, wherein the front lid, the rear lid and the connecting plate are on the way to the opening state; and FIG. 8(C) is a cross-sectional view for explaining lid opening and closing actions of the tape cassette, wherein the front lid is fully opened, and the pin $8d_1$ of the rear lid comes to the open top of the guide groove of the lower half member.

It is noted that in FIGS. 8(A)–8(C), the left-hand reference characters of the components of the tape cassette 301 only are shown and a description for the right-hand ones symmetric to the left-hand ones are omitted for simplicity.

A state shown in FIG. 8(A) is identical to one shown in FIG. 7 where the front lid 7 is closed, and the magnetic tape T is extended along the back surface of the front lid 7. Further, the connecting plate 9 is rotatably supported on the plate supporting portion $7d_1$ of the front lid 7 therebehind by causing the pin $9c_1$ thereof to be engaged, and the rear lid 8 is suspended from the arm $9d_1$ of the connecting plate 9 by causing the pin $8a_1$ of the rear lid 8 to be engaged. The front lid 7 is biased in the lid closed direction by the torsion spring 10.

Further, the guide pin $8d_1$ provided nearby the under portion of the rear lid 8 comes to the closed end of the guide groove $3p_1$ formed in the protruding portion $3p$ of the lower half member 8 being engaged with the guide groove $3p_1$. The rear lid 8 protects the lower portion of the magnetic tape T against dust and fingerprints from the openings $3a_1$–$3a_3$ (FIG. 7) in a wrapping manner by causing the lower end portion $8b_1$ of the rear lid 8 to abut on the inner wall of the triangular portion $7c_1$ of the front lid 7.

The front face of the magnetic tape T is protected by the front lid 7, and the upper and lower portions of the back face thereof are respectively protected by the connecting plate 9 and the rear lid 8. Thus the magnetic tape T is completely protected when the front lid 7 is closed, i.e., when it is not used.

Further, the connecting plate 9 is restricted to be held in the closed state against the biasing force of the torsion spring 11 by causing the cam $9a$ thereof to abut on the guide $2a_3$ protrudingly provided in the tapered shape on the upper half member 2.

As shown in FIG. 8(B), when the tape cassette 301 is loaded in the recording and reproducing apparatus (not shown), the front lid 7 is rotated to open in a clockwise direction (an arrow direction) on the pins $7a_1$, $7b_1$ of the front lid 7.

As the front lid 7 is rotated to open against the biasing force of the torsion spring 10, the connecting plate 9 is displaced upward by causing the at cam $9a$ provided at back surface of the connecting plate 9 to be abutting on the guide $2a_3$ of the upper half member 2, whereby the rear lid 8 suspended from the connecting plate 9 is displaced upward by being pivoted with the pin $8a_1$ thereof. Thus, the guide pin $8d_1$ provided on the rear lid 8 is displaced upward along the guide groove $3p_1$.

Therefor, the rear lid 8 suspended from the connecting plate 9 is opened in cooperation with the opening action of the front lid 7. The rear lid 8 can be smoothly opened parallel to the front lid 7 because of achieving two phases of freedom in the link mechanism.

Further, when the front and rear lids 7, 8 are rotated to open, the triangular portion $7c_1$ of the front lid 7 recedes from the front face of the magnetic tape T. On the other hand, the rear lid 8 is opened so that the lower end portion $8b_1$ of the rear lid 8 is kept away from contacting the back face of the magnetic tape T because the guide pin $8d_1$ of the rear lid 8 is guided in the guide groove $3p_1$.

Next, when the front lid 7 is opened further clockwise (i.e., in the direction of arrow) on the pin $7a_1$ from the state of FIG. 8(B), as shown in FIG. 8(C), the guide pin $8d_1$ of the rear lid 8 associated with the front lid 7 comes to the open top of the guide groove $3p_1$ to abut on the engagement recess $2a_{11}$ provided on the bottom of the front rim $2a_1$ for covering the open top of the guide groove $3p_1$. Thus the rear lid 8 is held at a position where it is not allowed to be opened any more.

At this time, the guide pin $8d_1$ provided on the rear lid 8 is prevented from coming off the guide groove $3p_1$ upwardly by the front rim $2a_1$ of the upper half member 2. Thus, it enables the front and rear lids 7, 8 to open sufficiently, which contributes to improve the reliability and quality of the tape cassette 301.

Incidentally, when the front and rear lids 7, 8 are closed, the closing action is reversed from the aforementioned ones, i.e., in the order of FIG. 8(C), FIG. 8(B), and FIG. 8(A), and their detailed description is omitted.

As a result, according to the present invention, when the tape cassette 301 is not mounted on the recording and/or reproducing apparatus, the front face of the magnetic tape extended along the back surface of the front lid 7 is protected by the front lid, and the upper and lower portions of the back face of the magnetic tape are respectively protected by the connecting plate 9 and the rear lid 8, thus the magnetic tape is completely protected against invasion of dust and fingerprints and further against foreign objects.

When the tape cassette is mounted in the apparatus, the rear lid is more easily opened and closed parallel to the front lid because the rear lid suspended by the front lid through the connecting plate is given a greater degree of freedom, i.e., 2 degrees of freedom based on a pivot point between the front lid and the connecting plate, and another pivot point between the connecting plate and the rear lid, compared with the foregoing prior art such as the 8 mm tape cassette wherein the rear lid is directly suspended on the front lid.

In the assembly process, when the front lid connected with the rear lid is attached to the upper half member, the pin of the rear lid is temporarily engaged with the engagement recess of the upper half member. Thus, the above semi-assembled upper half member is securely and safely attached to the lower half member without causing the front lid and the rear lid to contact the magnetic tape accommodated in the lower half member.

Moreover, the pin of the rear lid is guided by the guide groove of which the top open end is covered with the engagement recess, so that the pin is prevented from coming off from the open top of the guide groove. This enables a speedy and secure assembly to be performed and contributes to increase the reliability and quality of the tape cassette 301.

What is claimed is:

1. A tape cassette having a casing for accommodating a pair of reels disposed in the casing for winding a magnetic tape on the pair of reels and threading the magnetic tape along a front of the casing, a front lid disposed in openable/closable manners at the front of the casing for protecting a front face of the magnetic tape and rear cover means disposed at a back side of the front lid for protecting a back face of the magnetic tape, wherein the tape cassette comprises:

plate supporting means provided on an upper side of the front lid;

the rear cover means comprising first cover means having a first plate-like shape for protecting an upper portion of the back face of the magnetic tape and second cover means having a second plate-like shape for protecting a lower portion of the back face of the magnetic tape when the front lid is closed, the first cover means having arm member means and first pin means for rotatably supporting the first cover means on the plate supporting means of the front lid, the second cover means comprising second pin means and guide pin means for operating in cooperation with opening and closing actions of the front lid, the second cover means being suspended from the first cover means by causing the second pin means to engage with the arm member means of the first cover means;

guide groove means provided in the casing for slidably guiding the guide pin means of the second cover means both in a lid opening direction toward which the front lid is opened and a lid closing direction toward which the front lid is closed, by being engaged with the guide pin means of the second cover means;

first biasing means for biasing the front lid in the lid closing direction;

second biasing means for displacing the second cover means in the lid opening direction by biasing the first cover means toward a direction of the upper side of the front lid; and rear lid restricting means for restricting an opening action of the second cover means biased in the lid opening direction by the second biasing means when the front lid is closed, wherein the second cover means is suspended from the first cover means so that the first cover means covers the upper back face of the magnetic tape and the second cover means covers the lower back face thereof when the front lid is closed, and the second cover means together with the first cover means are slidably displaced along the guide groove means into a space defined within the front lid without colliding with a wall of the front lid.

2. A tape cassette as claimed in claim 1, wherein the plate supporting means of the front lid comprises at least a pair of plate supporting members provided separately from each other on the front lid at a first predetermined distance, and the first over means is rotatably provided substantially parallel to the front lid on the pair of plate supporting members through the first pin means.

3. A tape cassette as claimed in claim 2, wherein the arm member means of the first cover means comprises at least a pair of arm members separately provided at a second predetermined distance, and the second cover means is rotatably suspended substantially parallel to the front lid from the pair of arm members by causing the second pin means to be engaged with the pair of arm members.

4. A tape cassette as claimed in claim 3, wherein the guide groove means provided in the casing comprises a pair of guide grooves spaced at a third predetermined distance, and the guide pin means of the second cover means is constructed to be slidably fitted with the pair of guide groove means.

5. A tape cassette as claimed in claim 1, wherein the casing comprises an upper half member and a lower half member, the guide groove means is provided on the lower half member, and has at least an open top.

6. A tape cassette as claimed in claim 5, further comprising a front rim at a front of the upper half member, and an engaging recess provided at a bottom of the front rim, the engaging recess covering the open top of the guide groove means, whereby the engaging recess is used to be temporarily engaged with the guide pin means of the rear lid by causing the front lid to displace in the lid opening direction when the upper half member temporarily assembled with the front lid connected with the second cover means is attached to the lower half member in an assembly process.

7. A tape cassette as claimed in claim 5, further comprising opening means defined in a front side of the casing for allowing insertion of tape loading members provided in a recording and reproducing apparatus, tape guide means projecting from a wall of the lower half member in the opening means for guiding the back face of the magnetic tape therealong and a pair of protruding portions provided integrally with the tape guide means therebehind, the guide groove means being formed in the pair of the protruding portions, the guide pin means of the second cover means comprising a pair of guide pins, whereby the second cover means is guided in the lid opening and closing directions by causing the pair of guide pins to engage with the guide groove means provided in the protruding portions.

8. A tape cassette as claimed in claim 7, wherein the tape guide means comprises a pair of tape guides provided separately from each other at a fourth predetermined distance, and the opening means is divided into three openings by being provided with the pair of the tape guides therein, and the pair of protruding portions is provided integrally with the pair of the tape guides therebehind, respectively.

9. A tape cassette as claimed in claim 8, wherein a recess is defined between each of the pair of tape guides and each of the pair of the protruding portions to allow insertion of the second cover means.

* * * * *